United States Patent
Ngo et al.

(10) Patent No.: US 11,165,891 B2
(45) Date of Patent: Nov. 2, 2021

(54) HIGHLY AVAILABLE TRANSMISSION CONTROL PROTOCOL TUNNELS

(71) Applicant: DH2I COMPANY, Fort Collins, CO (US)

(72) Inventors: Thanh Q. Ngo, Oregon City, OR (US); Samuel Revitch, Portland, OR (US)

(73) Assignee: DH2I COMPANY, Fort Collins, CO (US)

( * ) Notice: Subject to any disclaimer, the term of this patent is extended or adjusted under 35 U.S.C. 154(b) by 24 days.

(21) Appl. No.: 16/551,360

(22) Filed: Aug. 26, 2019

(65) Prior Publication Data

US 2020/0068049 A1 Feb. 27, 2020

Related U.S. Application Data

(60) Provisional application No. 62/723,373, filed on Aug. 27, 2018.

(51) Int. Cl.
*H04L 29/06* (2006.01)
*H04L 12/66* (2006.01)
*H04L 12/46* (2006.01)
*H04L 29/12* (2006.01)

(52) U.S. Cl.
CPC ........ *H04L 69/163* (2013.01); *H04L 12/4633* (2013.01); *H04L 12/66* (2013.01); *H04L 61/2592* (2013.01); *H04L 69/164* (2013.01)

(58) Field of Classification Search
CPC .......... H04L 63/0272; H04L 63/08; H04L 29/12594; H04L 12/4633; H04L 63/166; H04L 69/163; H04L 12/66; H04L 61/2592; H04L 69/164; H04W 12/068; H04W 12/069; H04W 76/19
See application file for complete search history.

(56) References Cited

U.S. PATENT DOCUMENTS

| | | |
|---|---|---|
| 8,234,702 B2 | 7/2012 | Maes |
| 8,990,901 B2 | 3/2015 | Aravindakshan |
| 9,037,709 B2 | 5/2015 | Enns |
| 9,215,131 B2 | 12/2015 | Frey |
| 9,342,293 B2 | 5/2016 | Enns |

(Continued)

FOREIGN PATENT DOCUMENTS

| | | |
|---|---|---|
| EP | 3198464 A1 | 3/2016 |
| WO | 2016049609 A1 | 3/2016 |

OTHER PUBLICATIONS

Tschofenig, H., et al., "Transport Layer Security (TLS) / Datagram Transport Layer Security (DTLS) Profiles for the Internet of Things," Internet Engineering Task Force (IETF); ISSN 2070-1721; Jul. 2016; http://www.rfc-editor.org/info/rfc7925.

(Continued)

*Primary Examiner* — Ninos Donabed
(74) *Attorney, Agent, or Firm* — Martensen IP; Michael C. Martensen

(57) ABSTRACT

Redundant transmission control protocol tunneling of the present invention channels client application data through the public Internet via a secure UDP channel. By integrating one or more gateway applications interposed between an endpoint and the public Internet using local loopback addresses, the present invention provides network path failover redundancy.

14 Claims, 6 Drawing Sheets

(56) References Cited

U.S. PATENT DOCUMENTS

| | | | |
|---|---|---|---|
| 9,467,454 B2 | 10/2016 | Aravindakshan | |
| 9,577,909 B2 | 2/2017 | Li | |
| 9,577,927 B2 | 2/2017 | Hira | |
| 9,661,005 B2 | 5/2017 | Kamble | |
| 10,027,687 B2 | 7/2018 | Kamble | |
| 10,038,669 B2 | 7/2018 | Kizu | |
| 10,397,189 B1* | 8/2019 | Hashmi | H04L 63/1433 |
| 10,679,039 B2 | 6/2020 | Gallagher | |
| 2003/0088698 A1* | 5/2003 | Singh | H04L 12/4641 |
| | | | 709/239 |
| 2005/0002412 A1* | 1/2005 | Sagfors | H04L 1/16 |
| | | | 370/437 |
| 2005/0163061 A1 | 7/2005 | Piercey | |
| 2006/0029016 A1 | 2/2006 | Peles | |
| 2006/0235939 A1 | 10/2006 | Yim | |
| 2006/0245373 A1* | 11/2006 | Bajic | H04W 8/12 |
| | | | 370/254 |
| 2006/0268834 A1* | 11/2006 | Bajic | H04L 63/101 |
| | | | 370/352 |
| 2007/0002833 A1* | 1/2007 | Bajic | H04L 29/1282 |
| | | | 370/352 |
| 2008/0045267 A1* | 2/2008 | Hind | H04L 67/10 |
| | | | 455/557 |
| 2008/0072307 A1 | 3/2008 | Maes | |
| 2008/0144625 A1* | 6/2008 | Wu | H04L 12/4641 |
| | | | 370/392 |
| 2008/0291928 A1 | 11/2008 | Tadimeti | |
| 2009/0040926 A1 | 2/2009 | Li | |
| 2009/0122990 A1* | 5/2009 | Gundavelli | H04L 63/0272 |
| | | | 380/278 |
| 2009/0138611 A1 | 5/2009 | Miao et al. | |
| 2009/0287955 A1* | 11/2009 | Matsumoto | H04L 12/4633 |
| | | | 714/4.1 |
| 2010/0125903 A1* | 5/2010 | Devarajan | G06F 21/577 |
| | | | 726/15 |
| 2010/0161960 A1 | 6/2010 | Sadasivan | |
| 2010/0246545 A1* | 9/2010 | Berzin | H04W 84/005 |
| | | | 370/338 |
| 2011/0082941 A1* | 4/2011 | Kim | H04L 61/256 |
| | | | 709/227 |
| 2011/0153793 A1* | 6/2011 | Tan | H04L 63/0272 |
| | | | 709/222 |
| 2011/0202610 A1* | 8/2011 | Chaturvedi | H04L 29/12528 |
| | | | 709/206 |
| 2012/0162445 A1* | 6/2012 | Kim | H04N 21/47202 |
| | | | 348/207.1 |
| 2012/0166593 A1 | 6/2012 | Yoon et al. | |
| 2012/0226820 A1 | 9/2012 | Li | |
| 2013/0133043 A1 | 5/2013 | Barkie | |
| 2013/0283364 A1 | 10/2013 | Chang | |
| 2013/0298201 A1 | 11/2013 | Aravindakshan | |
| 2014/0200013 A1 | 7/2014 | Enns | |
| 2014/0207854 A1 | 7/2014 | Enns | |
| 2014/0269774 A1* | 9/2014 | Callard | H04N 21/222 |
| | | | 370/477 |
| 2015/0026262 A1 | 1/2015 | Chaturvedi et al. | |
| 2015/0195293 A1 | 7/2015 | Kamble | |
| 2015/0195684 A1* | 7/2015 | Lohmar | H04W 76/40 |
| | | | 370/312 |
| 2015/0229649 A1 | 8/2015 | Aravindakshan | |
| 2015/0381484 A1 | 12/2015 | Hira | |
| 2016/0112372 A1* | 4/2016 | Katz | H04L 63/029 |
| | | | 726/15 |
| 2017/0134399 A1 | 5/2017 | Kamble | |
| 2017/0149548 A1 | 5/2017 | Mouhouche | |
| 2017/0237708 A1 | 8/2017 | Klaghofer | |
| 2018/0077267 A1* | 3/2018 | Bayer | H04L 12/2856 |
| 2019/0089557 A1* | 3/2019 | Sung | H04L 63/205 |

OTHER PUBLICATIONS

PCT/US2019/045425; International Search Report and Written Opinion of the International Searching Authority; dated Oct. 24, 2019.
PCT/US2019/045431; International Search Report and the Written Opinion of the International Searching Authority; dated Oct. 28, 2019.
Reardon, Joel, et al.; "Improving Tor using a TCP-over-DTLS Tunnel"; May 25, 2009; http://www.cypherpunks.ca/~iang/pubs/TorTP.pdf (15 pages).
PCT/US2019/045430; International Search Report and Written Opinion of the International Searching Authority; dated Oct. 24, 2019.
PCT/US2019/048355; International Search Report and the Written Opinion of the International Searching Authority; dated Oct. 28, 2019.
Tan, J., et al.; "Optimiing Tunneled Grid Connectivity Across Firewalls"; CRPIT vol. 99, Grid Computing and e-Research 2009; Proc. 7th Australasian Symposium on Grid Computing and e-Research (AusGrid 2009), Wellington, New Zealand; pp. 21-28.
PCT/US2019/045425; International Preliminary Report on Patentability; The International Bureau of WIPO; dated Feb. 18, 2021.
PCT/US2019/045430; International Preliminary Report on Patentability; The International Bureau of WIPO; dated Feb. 18, 2021.
PCT/US2019/045431; International Preliminary Report on Patentability; The International Bureau of WIPO; dated Feb. 18, 2021.
PCT/US2019/048355; International Preliminary Reporton Patentability; The International Bureau of WIPO; dated Mar. 11, 2021.

* cited by examiner

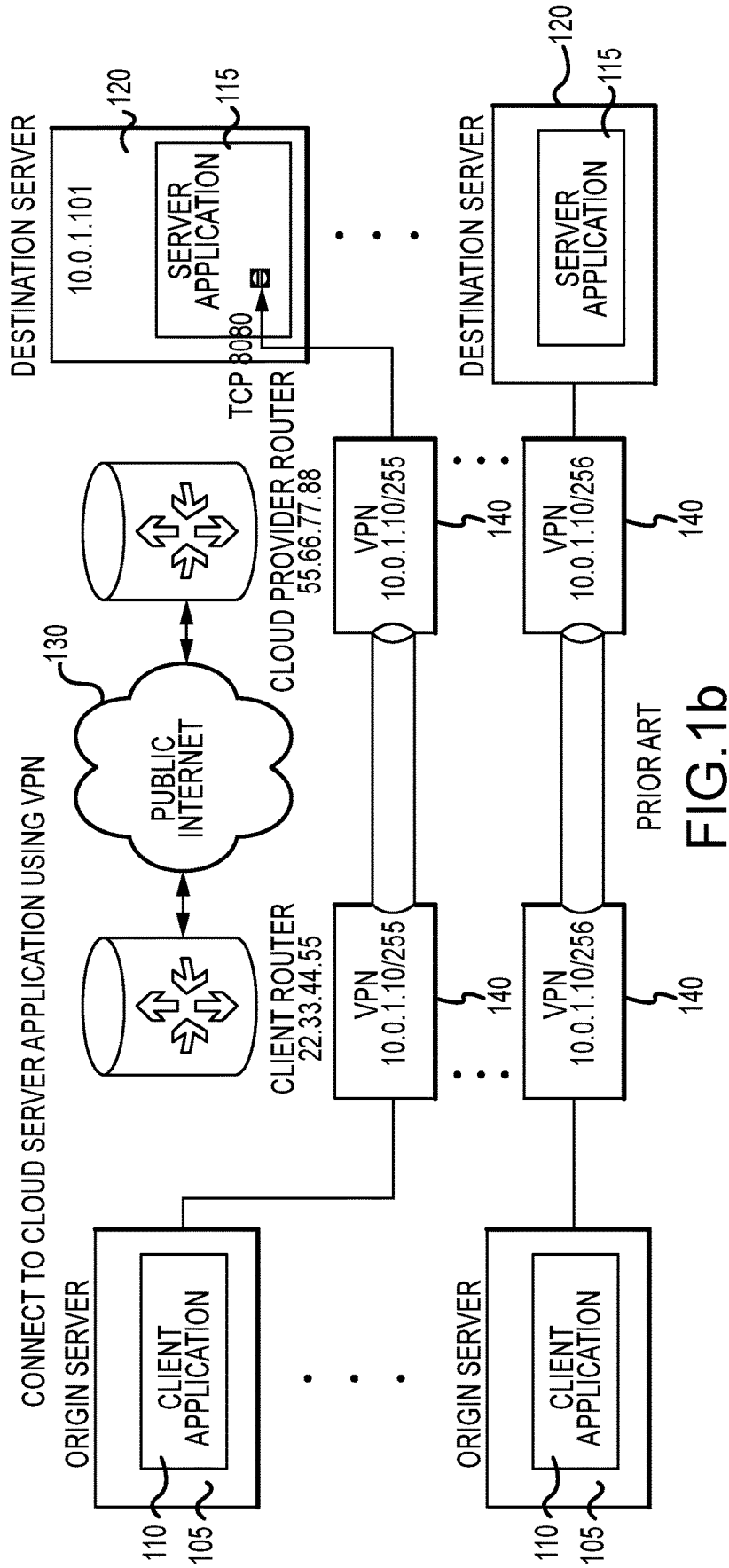

HIGHLY AVAILABLE TRANSMISSION CONTROL PROTOCOL TUNNELS

RELATED APPLICATION

The present application relates to and claims the benefit of priority to U.S. Provisional Patent Application No. 62/723,373 filed 27 Aug. 2018, which is hereby incorporated by reference in its entirety for all purposes as if fully set forth herein, and is further related to commonly assigned U.S. Non-Provisional patent application Ser. No. 16/532,727 filed 6 Aug. 2019.

BACKGROUND OF THE INVENTION

Field of the Invention

Embodiments of the present invention relate, in general, to server cluster availability and more particularly to providing highly available and redundant transmission control protocol tunnels across a public network in a server cluster environment.

Relevant Background

A server cluster is a set of loosely or tightly connected computers that work together so that, in many respects, they can be viewed as a single system. A distributed application is one that is spread among several connected computers to leverage their combined processing power and to provide redundancy. The components of a cluster are usually connected to each other through Local Area Networks (LANs), with each node running its own instance of an operating system and an application. Clusters are usually deployed to improve performance and availability over that of a single computer, while typically being much more cost-effective than single computers of comparable speed or availability. And since most clusters operate inside a LAN they can freely communication avoiding security concerns present with interaction of the public Internet.

FIG. 1a depicts a typical connection between a client application 110, resident on an origin server 105, and a server application 115, resident on a destination server 120 within the same LAN. Traditional clustering software is intended to be deployed on a well-controlled LANs for two reasons. First, and as expressed above, vendors consider software on a LAN to be secure or at least more secure than to provide direct access to their software or services over the public Internet. Second, Individual layer-4 communication channels required for traditional clustering software to function are diverse and are easier to manage inside a LAN.

In the normal operation of Transmission Control Protocols ("TCP")/Internet Protocol ("IP") suite of communication protocols, as depicted in FIG. 1a, a client application on IP address A requests a new connection to the destination server on IP address B. Typically, communication with the destination server is on server application TCP port 8080. On that port the destination server observes a connection request from IP address A.

Every device connected to a network must have a unique IP address to differentiate it from the others. An IP address is similar to the unique telephone number on your home phone or mobile device. The difference is that it consists of four segments called octets that are separated by a period. The numbers within each octet range between 0 and 255.

No other device on a network, unless you are using network address translation via a router to provide a common outward facing identification, will have the same IP address. Therefore, for a device to communicate with another, the sending device must know the location of the destination before it can begin transmitting data. Depending on the locations of the source and destination devices as they relate to the subnet mask, the process of discovering the location of the destination device address will vary.

These diverse criteria necessitate dedicated interconnecting channels between networks to enable server cluster operations as depicted in FIG. 1b. To span clusters across multiple LANs via the public Internet 130 vendors predominately use of dedicated Virtual Private Networks 140 or VPNs, for both security, and to provide an unrestricted layer-3 network path between servers to support the diverse set of required layer-4 communication channels.

A VPN is a secure tunnel through which communication and data can flow between two points securely. Recall that the Internet is a packet-switched network meaning there is no single, unbroken connection between sender and receiver. Instead, when information is sent, it is broken into small packets and sent over many different routes to the same location at the same time, and then reassembled at the receiving end. This is opposed to circuit-switch network such as the telephone system which, after a call is made and the circuits are switched, carve out part of the network for a single direct connection.

And to network a plurality of servers located in one LAN to those resident in another LAN via a public network such as the Internet, a plurality of VPNs are established. The process is expensive and complex. Moreover, each VPN tunnel traverses each LAN's router making the router a single point of failure.

Tunneling protocol works by using the data portion of a packet (the payload) to carry the packets that actually provide the service. Tunneling uses a layered protocol model such as those of the TCP/IP protocol suite, but usually violates the layering when using the payload to carry a service not normally provided by the network. Typically, the delivery protocol operates at an equal or higher level in the layered model than the payload protocol.

Unfortunately, tunneled IP traffic may not receive the intended level of inspection or policy application by network-based security devices unless such devices are specifically tunnel aware. This reduces defense in depth and may cause security gaps. This applies to all network-located devices and to any end-host-based firewalls whose existing hooking mechanism(s) would not show them the IP packet stream after the tunnel client does decapsulation or before it does encapsulation. Moreover, IP addresses inside tunnels are not subject to ingress and egress filtering in the network they tunnel over, unless extraordinary measures are taken. Only the tunnel endpoints can do such filtering which limits security.

Other problems with tunnels include NAT holes as well as the possibility that the tunnel address can be surmised. Indeed, target addresses can be profiled as the address reveals some information as to the nature of the client. A need therefore exists to create a more secure means by which to communicate between servers in a network environment, especially when such servers are associated in a server cluster.

Another alternative is to set up a secure shell application to provide TCP tunneling. Such an application establishes point-to-point TCP connections between sites, and provides authentication and basic internal services, and including access to a command shell and files on the server side. It can also be configured to open multiple TCP tunnels from one side to the other via a router. However, if the shell application gateway or the router fails, the connectivity is lost. A need therefore exists to maintain connectivity in the event of a failure of a router, an origin gateway or destination gateway. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

Highly available and redundant Transmission Control Protocol ("TCP") tunnels across a public network such as the Internet, without utilizing a Virtual Private Network ("VPN"), are features of the present invention. The present invention provides automatic failover capability for origin and destination tunnel gateways thereby providing highly available networks for applications. Other TCP tunneling technologies, such as VPNs, are not capable of self-healing, automatic failover, and rerouting on their own. One must manually reconfigure or re-setup to restore network services. The present invention integrates one or more gateway applications interposed between a distributed application and the public Internet so as to communicate using local loopback tunnel endpoints to provide network path failover redundancy.

One version of the present invention for highly available TCP tunnel is a system including an instantiation of a distributed application operative in a cluster environment and a client application, separated by, but communicatively coupled with each other through, a wide area network, i.e., the Internet. This communicative coupling (TCP tunneling) includes two or more instantiations of a destination gateway application interposed between the instantiation(s) of the distributed application and the network. Each instantiation of the destination gateway application is communicatively coupled to the distributed application.

The destination gateway applications are configured to establish redundant TCP tunnels, each suitable for application data transfer using a UDP datagram-oriented communication channel. Each instantiation of the destination gateway application includes a cluster monitor that is configured to monitor TCP tunnel status and, responsive to identifying failure of communication with the distributed application instantiation along a primary channel, reassign one of the other redundant TCP tunnels as means by which to convey data.

The present invention can also include instantiations of an origin gateway application interposed between the client application and the network. These instantiations are in communication with the client application and each are configured to establish redundant TCP tunnels through which application data can be transferred using a UDP datagram-oriented communication channel. As with the destination gateway applications, the origin gateway applications monitor TCP tunnel status and, responsive to identifying failure of communication with the client application instantiation along a primary channel, reassign one of the other redundant TCP tunnels as means by which to convey data.

In the instance of the present invention described above, client application data is packaged into a UDP transport suitable format by one of the origin gateway applications and transported across the network to a destination gateway applications, ultimately to arrive at the distributed application.

Another embodiment of the present invention is a methodology for establishing highly available TCP tunnels in a server cluster environment. Such a method includes communicatively coupling a client application to a wide area network (such as the Internet) and interposing instantiations of a destination gateway application between a distributed application and the wide area network.

Redundant TCP tunnels are established between the client application and the distributed application through the gateway applications. From among the redundant TCP tunnels a primary TCP tunnel is selected whereby client data is transported. The methodology further includes monitoring network communication status of the redundant TCP tunnels including the primary TCP tunnel and should communication fail, reassign a different, yet active TCP tunnel as the new primary TCP tunnel. The tunnels established using the method describe above includes a UDP datagram-orientated communication channel that traverses the wide area network.

The system and method described above can include, and be implemented on, a machine capable of executing instruction embodied as machine executable code stored on a non-transitory storage medium.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein:

FIG. 1a and FIG. 1b are high level network connection diagrams illustrating typical configurations for connecting a client application to a server application as would be known to one of reasonable skill in the relevant art.

Figure 2:
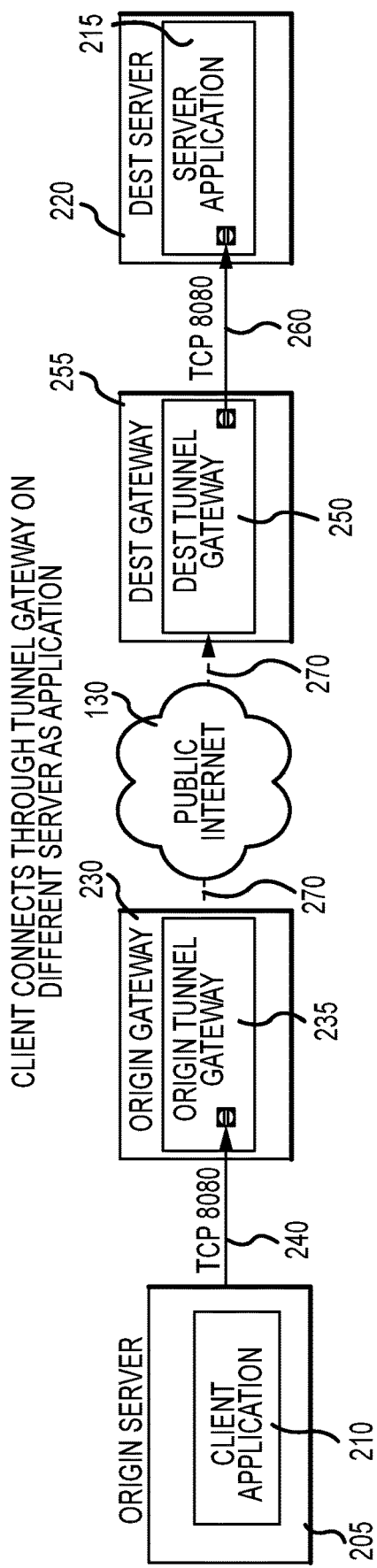
FIG. 2 depicts a network communication configuration for transmission control protocol tunneling over the public Internet according to one or more embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Redundant transmission control protocol tunneling whereby client application data is forwarded through the public Internet via a secure UDP channel, is hereafter described by way of example. Integrating one or more gateway applications interposed between a distributed application and the public Internet so as to communicate using a local loopback tunnel endpoint provides failover redundancy.

A group of gateway applications lie between the public Internet and each the client application and distributed application instantiations. Each gateway establishes independent redundant paths by which the client application may communicate with each instantiation of a distributed application. Upon failover of the communication path to the distributed application, the client application switches to a different, yet already established transmission control protocol tunnel. As this secure communication tunnel is already established, downtime during failover due to establishing new communication tunneling is minimized.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

For the purpose of the present invention the following acronyms and terms are assumed to represent and should be interpreted as:

IP—internet protocol. Occupies layer-3 in the OSI model. The Internet Protocol is responsible for ensuring packets are sent to the correct destination.

IPv4—Internet protocol version 4, with a 32-bit address space

ISP—Internet Service Provider

OSI Model—Open Systems Interconnection model, a standard characterization of functional layers of networking using seven layers as opposed to the four layers of the TCP model.

Port—A Port is opening on a machine through which data can flow.

Port Forwarding—A technique provided by most NAT routers to allow connections from the public Internet to an internal server NAT—Network Address Translation, a technology used prolifically to connect local area networks to the public Internet. NAT enables a plurality of servers (computers) to interact with the public internet via a single external IPv4 address.

TCP—Transmission Control Protocol, a stream-oriented, reliable-delivery data transfer protocol. The Transmission Control Protocol provides a communication service at an intermediate level between an application program and the Internet Protocol. It provides host-to-host connectivity at the transport layer of the Internet model. An application does not need to know the particular mechanisms for sending data via a link to another host, such as the required IP fragmentation to accommodate the maximum transmission unit of the transmission medium. At the transport layer, (layer 4 in the OSI model) TCP handles all handshaking and transmission details and presents an abstraction of the network connection to the application typically through a network socket interface.

Tunnel or Tunneling Protocol (also referred to herein as a channel)—In computer networks, a tunneling protocol is a communications protocol that allows for the movement of data from one network to another. It involves allowing private network communications to be sent across a public network (such as the Internet) through a process called encapsulation. Because tunneling involves repackaging the traffic data into a different form, perhaps with encryption as standard, it can hide the nature of the traffic that is run through a tunnel. The tunneling protocol works by using the data portion of a packet (the payload) to carry the packets that actually provide the service. Tunneling uses a layered protocol model such as those of the OSI or TCP/IP protocol suite.

UDP—User Datagram Protocol, a not-necessarily-in-order datagram delivery protocol, used over IP. UDP uses a simple connectionless communication model with a minimum of protocol mechanisms. UDP provides checksums for data integrity, and port numbers for addressing different functions at the source and destination of the datagram. UDP does not use any handshaking dialogues, and thus exposes the user's program to any unreliability of the underlying network. Occupies layer-4 in the OSI model.

GRE—Generic Routing Encapsulation, a simplified datagram-oriented protocol used by certain VPNs to exchange layer-2 or layer-3 traffic. GRE itself may be considered layer-4 in the OSI model, as it sits above layer-3 protocols, but is considered to break the layering order by containing messages from lower layers.

Host Networking Stack—The primary network state machine running on a server or any other networked computer and is typically, part of the operating system kernel. The Host Networking Stack provides layer-4 socket services for TCP and UDP protocols, as well as state machines for layer-3 protocols such as IPv4/IPv6, layer-2 protocols, network hardware drivers, and virtual network drivers for VPNs.

LAN—Local Area Network.

WAN—Wide Area Network. A network that typically connects distant sites to one another or to the public Internet. The public Internet is considered a WAN.

VPN—Virtual Private Network. A layer-2 or layer-3 networking technology that allows local networks to be securely extended or bridged over WANs, such as the public Internet.

Transport Layer Security. A method for establishing private, authenticated communication channels over stream-oriented communication channels such as TCP.

WSFC—Microsoft Windows Server Failover Clustering; software that allows servers working together as a computer cluster.

DTLS—Datagram Transport Layer Security. A method for establishing private, authenticated communication channels over non-reliable, out-of-order datagram communication channels such as UDP.

Socket A network Socket is an endpoint instance, defined by a hostname or IP address and a port, for sending or receiving data within a node on a computer network. A socket is a representation of an endpoint in networking software or protocol stack and is logically analogous to physical female connections between two nodes through a channel wherein the channel is visualized as a cable having two mail connectors plugging into sockets at each node. For two machines on a network to communicate with each other, they must know each other's endpoint instance (hostname/IP address) to exchange data.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Redundant TCP connection tunneling of the present invention allows a client application resident on an origin server to connect to a distributed application resident on one or more destination servers in situations where it may not have a secure network route such as through a VPN connection. With reference to FIG. 2 (showing a single TCP tunnel), an origin gateway server 230, running an origin tunnel gateway application 235, establishes a direct layer-4 network TCP route 240 between the origin gateway server 230 and a client application 210 resident on an origin server 205. The origin tunnel gateway application 235 has a counterpart destination tunnel gateway application 250 resident, in one embodiment, on a destination gateway 255, with which it has an established a message channel 270. The destination tunnel gateway application 250 initiates a direct layer-4 network TCP route 260 to the destination server 220 on which the server application 215 is running.

Client application data, arriving at the origin tunnel gateway application in a TCP communication format, is repackaged to conform with UDP communication criterion. Once reformatted or packaged, the client application data is transmitted over the public Internet using a single, private and secure UDP datagram-oriented communication channel 270.

The origin tunnel gateway includes listening TCP sockets configured to accept new connections. When a new connection is accepted, the origin tunnel gateway application signals the destination tunnel gateway application to initiate a new outbound TCP connection to the predetermined server application on the destination server. Once successfully connected, all TCP data received from the origin socket is converted to a UDP format and forwarded to the destination socket through a UDP channel and thereafter restored to its original TCP format before delivery to the server application.

Each tunnel provides a secure, private TCP communication between disconnected/geographical networks over untrusted networks, such as the public Internet using a UDP datagram-oriented communication channel. It provides functionality similar to a VPN, however has greater security advantages and is less complex. The present invention, as herein described, can be integrated with an application management platform, to provide automatic connectivity of distributed applications across the public Internet. This can support simplified configuration of high-availability, replication, and disaster recovery features associated with server clusters, without the need for a VPN, or any reconfiguration of the host networking stack.

As one of reasonable skill in the relevant art will appreciate, one implementation of the present invention is as part of a high-availability application clustering software system. A high-availability clustering system manages applications that can run on any one server of the server cluster and move the application between servers in response to failures. In such an instance the present invention is configured to automatically reconfigure tunnel origins on inactive servers across a public network to support application access to such servers from any other server, regardless of which server on which the application is active.

While beyond the scope of this disclosure, the TCP connection tunnels described in connection with the present invention are assumed to be negotiated and transported using a UDP datagram-oriented communication channel, containing a DTLS encapsulation for authentication and security. One embodiment of the present invention employs a public intermediary registry service to discover and establish UDP message paths between participating tunnel gateways over the public Internet.

When a TCP tunnel is created per the technique described above, it has three immediate points of failure. Any failure of the origin gateway, the network between the origin and destination gateways, and at the destination gateway will cause the tunnel, and any active sessions on the tunnel, to fail. One embodiment of the present invention specifies a method of adding redundancy to the three aforementioned points of failure, and automating the process of replacing components and/or rerouting communication, to maintain availability of the TCP tunnel and therefore access to the distributed application.

Figure 3:
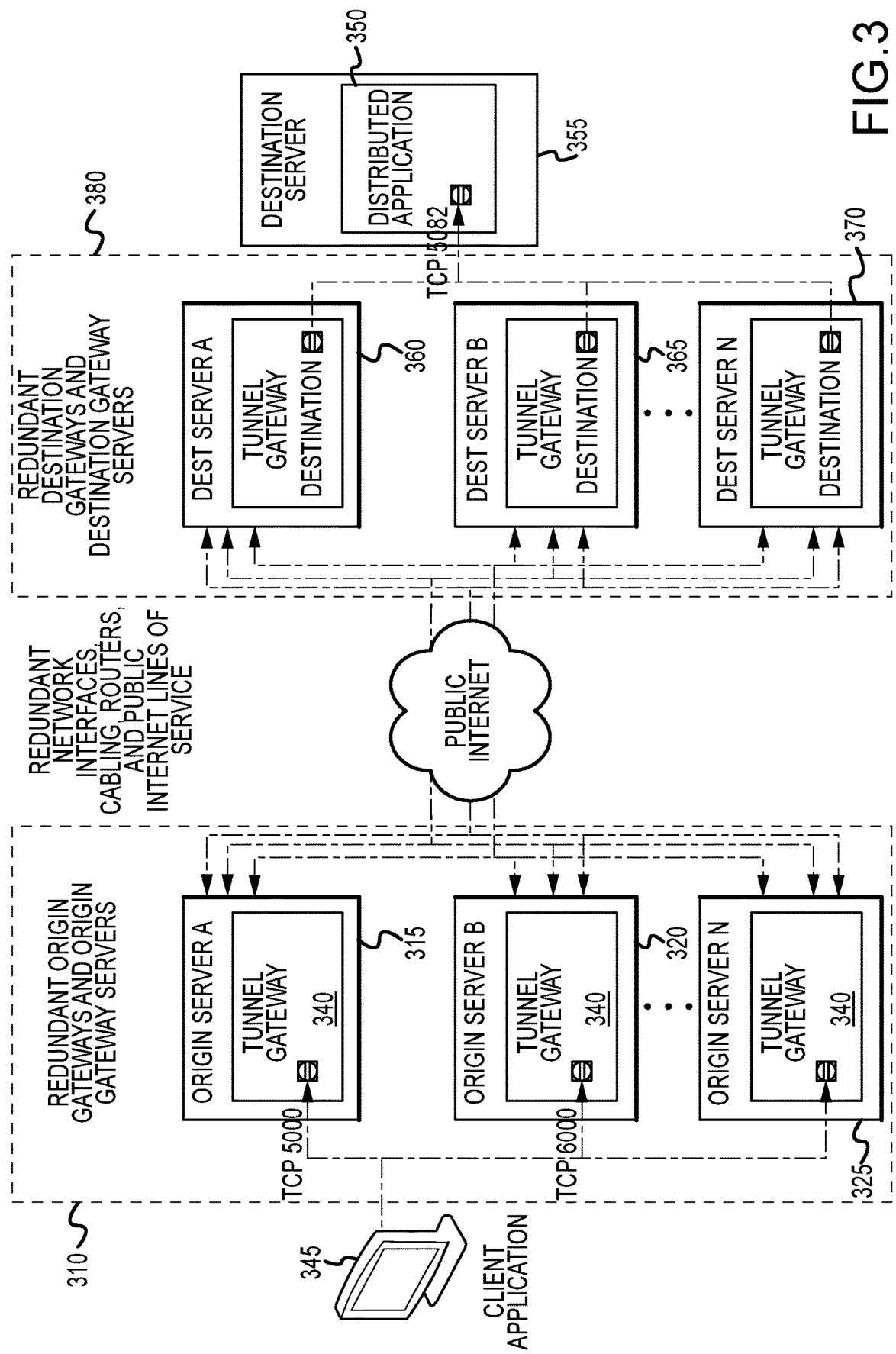
FIG. 3 depicts a network communication configuration for redundant transmission control protocol tunneling over the public Internet according to one embodiment of the present invention.

The present invention supports the use of multiple origin gateways for the same UDP message path. With reference to FIG. 3, N servers, (Origin Gateway Server A 315, Origin Gateway Server B 320, to Origin Gateway Server N 325) run instances of the tunnel gateway application 340, and are configured as origin gateways for a secure communication tunnel between the client application 345 and a distributed application 350. Through this configuration, the client application 345 has multiple possibilities paths by which to access the distributed application 350 resident on a destination server 355.

For example, the client application 345 may be associated with IP address 10.1.0.100 while Origin Gateway Server A 315 possesses an address of 10.1.0.11, Origin Gateway Server B 320 an address of 10.1.0.12, and Origin Gateway Server N 325 possesses an address of 10.1.0.N. Similarly, the distributed application 350 on a destination server 355 may possess an IP address of 10.2.0.100 with Destination Gateway Server A 360 possessing an IP address of 10.2.0.11, Destination Gateway Server B 365 an address of 10.2.0.12, and Destination Gateway Server N 370 possesses an address of 10.2.0.N. Moreover the Origin Gateway group 310 may possess an IP address of 10.1.0.201 and the Destination Gateway Group 380 address of 10.2.0.201.

The use of multiple network paths to communicate between origin tunnel gateways and destination tunnel gateways is an aspect of the present invention. As shown in FIG. 4, the client site and destination site both have redundant local area networks, each with its own redundant line of service to the public Internet. Each origin gateway server (Origin Gateway Server A, Origin Server B to Origin Server N) has redundant network interfaces as well as a path to each local area network at the client site. Each destination gateway server (Destination Gateway Server A, Destination Server B to Destination Server N) has redundant network interfaces to the public Internet and one to each local area network at the destination server/distributed application. In the event of a failure of a network interface, network switch, router, Internet service uplink or other situation in which the connection between the client application and the distributed application fail, there are redundant network paths that are usable.

The tunnel gateways continuously monitor the availability of one another, and all possible network paths between each pair of gateways. The tunnel gateways identify a set of active network paths from the available network paths. In the event of a network failure along one of the active network paths, the tunnel gateways detect the loss of communication, tests communication on all other configured network paths, identifies a set of operational network paths, and reassigns the primary network path to an operational network path. This is referred to as network path failover.

In one embodiment of the present invention the origin gateway application is associated with a virtual IP address independent of the gateway server's IP address. The virtual IP address of the origin gateway application (tunnel origin) is bound to the primary origin gateway server forming the primary TCP tunnel. In event of failure of the primary origin gateway server, the virtual IP address of the origin gateway application is associated with a different, yet available, origin gateway server. In that manner, regardless of which origin gateway server is being used, the client application need only know the virtual IP address, not the address of the origin gateway server.

To better understand the intricacies of the present invention, consider the following example. In one example (referring generally to FIG. 3), the application coordinator 441 for a particular tunnel, chooses an origin gateway server to act as the primary origin gateway, and communicates with the host engine 460 to establish and bind the tunnel origin's virtual IP address to that gateway. The application coordinator 441 then chooses a destination gateway server to act as the primary destination gateway, and communicates with the cluster monitor to configure pipe listener blocks on the destination gateway server, and similarly configures TCP listener blocks on the origin gateway servers to forward connections to the pipe listener block. The application coordinator 441 also communicates with the cluster monitor 410 to ensure all other gateway servers in the gateway group 310, 380 so that they can correctly participate in the cluster quorum. Similarly, the cluster monitor 410 monitors other applications instantiated at other nodes within the cluster.

The application coordinator 441 is operable to associate a virtual host and a virtual Internet protocol address with the primary origin gateway application assigned to the primary origin gateway server. For purposes of the present invention, a virtual host is a logical instance container that operates on top of physical and virtual servers, and accordingly does not include an operating system. A virtual host is not a virtual machine. Each virtual host instantiates and is tied to the virtual IP address of the gateway server. At least one instantiation of the gateway application is configured to operate on top of one of the one or more virtual hosts at each server. Accordingly, upon failover the virtual host migrates to another server along with the application instance(s) and the virtual IP address(es).

As one of reasonable skill in the relevant art will appreciate, there can be multiple reasons for network communication failure between a client application and an instantiation of a distributed application. For example, the server on which the distributed application is operating may fail causing the distributed application to shift to a new instantiation. In other instance a network switch may fail cutting off communication between the client and the distributed application instantiation, even though the instantiation of the distributed application is operational.

The present invention monitors network traffic along multiple redundant communication paths between the client application and the disturbed application including the primary communication path, and upon recognizing a failure in that traffic along the primary path, reassign the communication route to an alternative.

Recall that while the present invention specifies that each tunnel is configured with one or more possible destination gateways, one of them is chosen as the active gateway at any given time. The tunnel gateways coordinate with each other to ensure that one member of the current set of available origin—destination gateways is set as the active or primary gateway whenever possible. In the event of a failure of the current active gateway, a new gateway is chosen from the inactive set, and the gateways are reconfigured. This is referred to, according to the present invention, as destination gateway failover.

The invention's internal representation of tunnel state describes each complete client application to origin gateway to destination gateway to server application connection or tunnel session, as a state shared between the origin tunnel gateway and the destination tunnel gateway. The tunnel session is not associated with any particular network path between the tunnel gateways. Because of this lack of association, network path failover can occur without interruption to active tunnel sessions.

One of reasonable skill in the relevant art will recognize that when performing destination tunnel gateway failover, active tunnel sessions are interrupted. Necessarily, the TCP connection between a failed destination gateway and the server application would have to be reestablished between the newly activated destination gateway and the server application, which is beyond the scope of the invention. However, on successful destination gateway failover, while any active tunnel sessions will be disconnected, the client application will be able to reconnect to the server application in the same manner as before and replace its lost sessions.

Figure 4A:
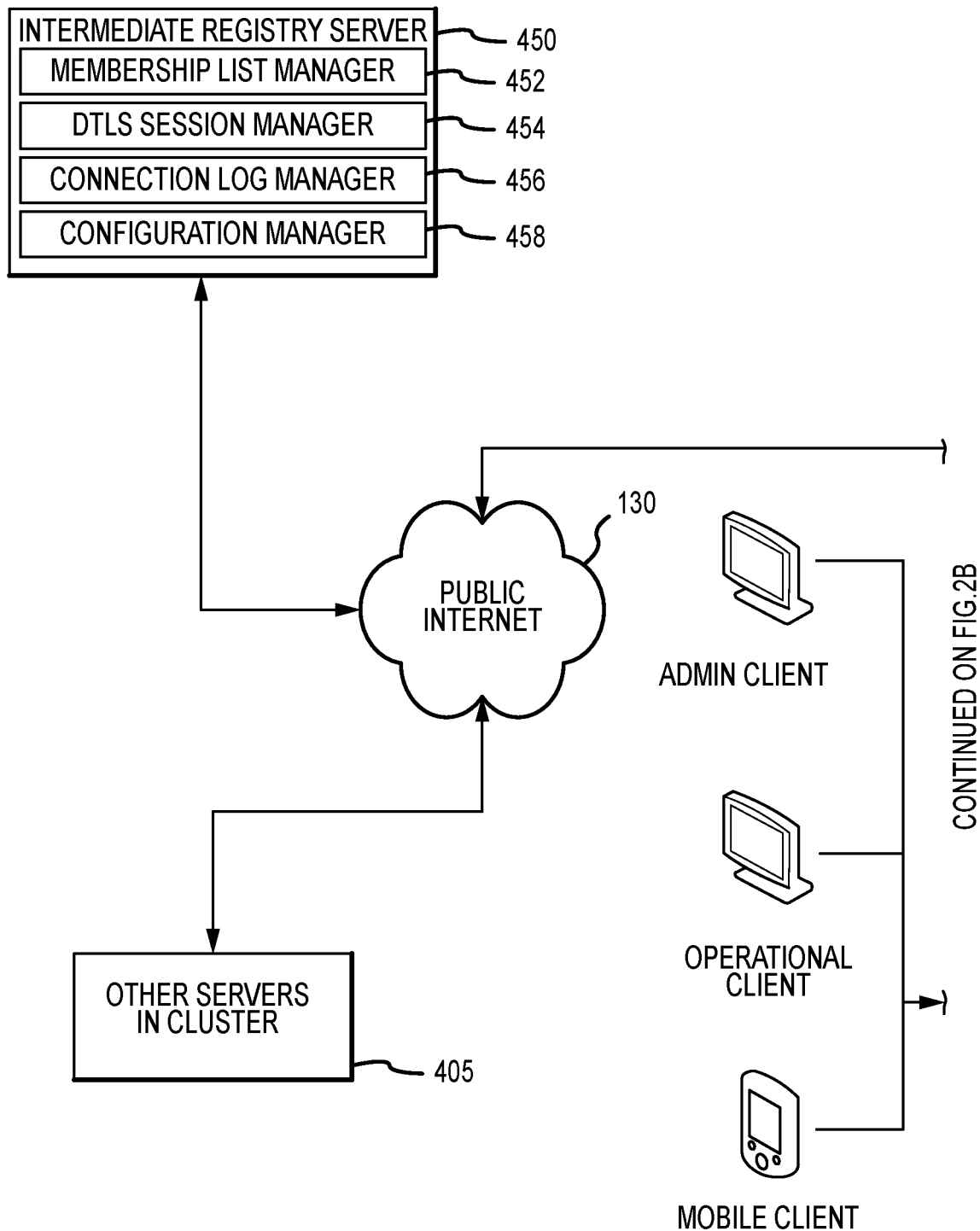
FIGS. 4a and 4b represent a system architecture drawing of a distributed server cluster showing various components, engines and modules used to provide redundant transmission control protocol tunneling and forwarding of client application data via a secure UDP channel, according to one embodiment of the present invention.
Figure 4B:
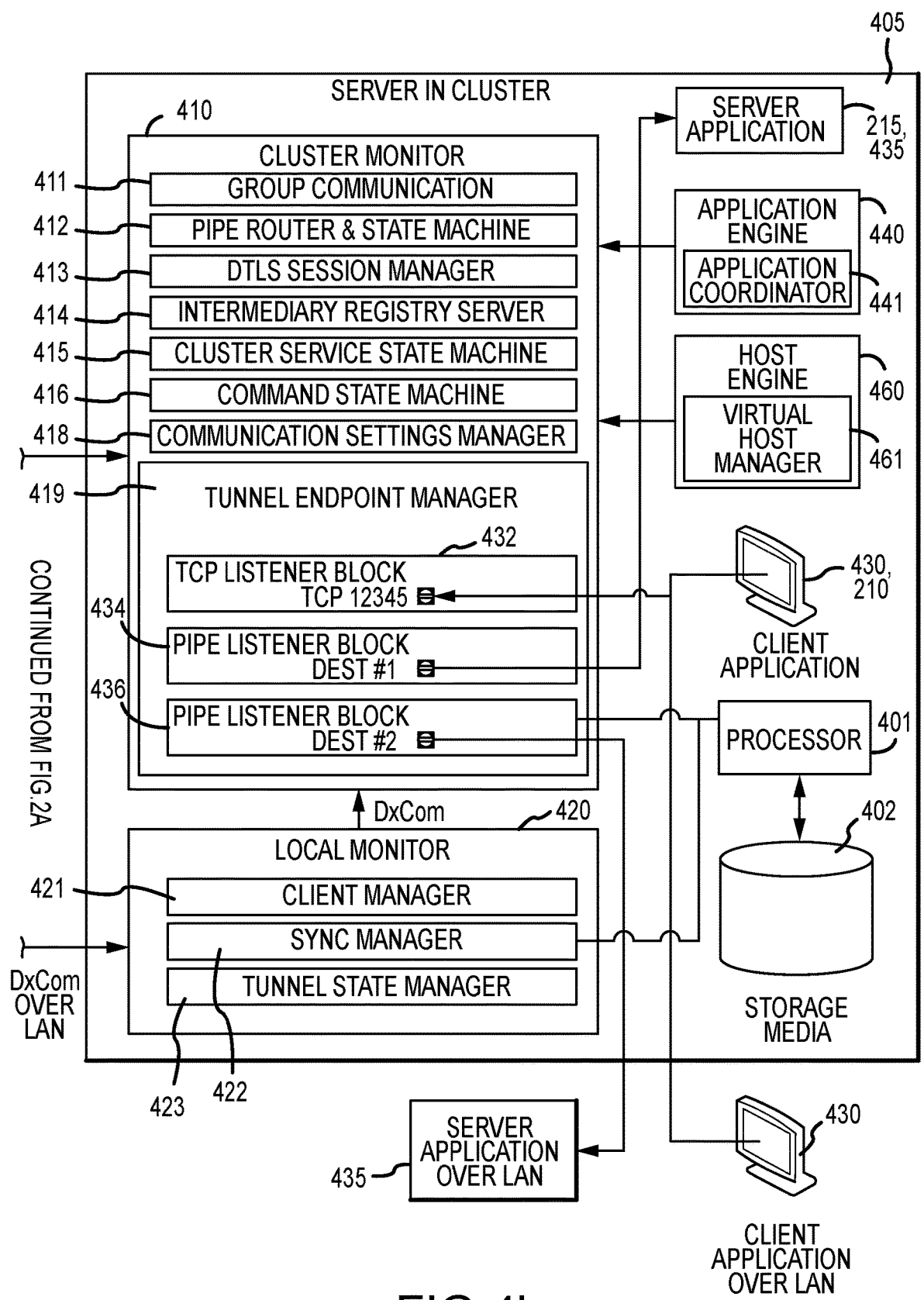

Referring now to FIGS. 4a and 4b, one embodiment of the present invention includes one or more servers 405 communicatively coupled to a public Internet 130 wherein each server includes, among other things, a cluster monitor 410, a local monitor 420, a processor 401, and a non-transitory storage media 402. Operating on one or more of the servers 405, or interacting with a server via a LAN, is a client application 430 and/or a server application 435. The invention supports the operation of TCP tunnels for use by these applications across a public Internet. TCP tunnels allow applications as illustrated and described herein to connect to one another through incongruent networks, without opening access to the public Internet 130. Further, communicatively coupled to the Internet is an Intermediary Registry Server 450 enable cluster formation across a public Internet.

The Cluster Monitor 410 shown in FIG. 4 is responsible for establishing communication of all available servers participating in the tunnel gateway network, monitoring server availability, providing virtual synchrony through its coordinator, monitoring and synchronizing the state of attached service processes (Cluster Service(s)), relaying commands between Cluster Service members, and maintaining tunnel endpoints. As the present invention makes it possible and valuable to build networks of more than two tunnel gateway servers, the group of tunnel gateway servers will be referred to as a cluster, and the primary networking component, the Cluster Monitor From the point of view of the Cluster Monitor 410, a Cluster Service is an external software component participating in a named group. The Cluster Monitor 410 informs all Cluster Services participating in the same group of each other's presence, and any changes that may occur to that group. The Local Monitor 420 component functions as a Cluster Service. Any server in the group can serve in this role. Components of the Cluster Monitor include:

Group Communication module 411—Responsible for establishing communication with all available servers involved in the cluster, monitoring server availability and communication channels, and electing a server as the cluster coordinator. This includes enumeration of available network interfaces, continuous monitoring of network path availability, and selection/failover of active network paths.

Pipe Router and State Machine 412—Provides reliable, in-order stream-oriented messaging channels, over the unreliable, out-of-order, datagram-oriented UDP communication channel. Manages pipe sockets, both listening sockets and outgoing connections. The communication channels provided by this module are used by the Tunnel Endpoint Manager to establish new tunnel sessions and to exchange data on existing sessions. The Pipe Router and State Machine is also used internally by other Cluster Monitor components to communicate with other servers. The pipe state machine is similar to the TCP module found in most host networking stacks, and performs largely the same function, however in the current invention it acts as a private TCP-like software component within the Cluster Monitor component.

DTLS session manager 413—Responsible for establishing authenticated DTLS sessions with other servers in the cluster over UDP Intermediary Registry Server client 414—This client manages communication with the Intermediary Registry server, including NAT configuration discovery, group registrations, and invitations Cluster Service State Machine 415—Responsible for monitoring availability of Cluster Services, processing changes to the set of available Cluster Services, and informing active Cluster Service components running on each system of the current service membership.

Command State Machine 416—Monitors the state of relay commands submitted by various Cluster Services. This module also ensures consistent ordering of relayed commands, and the reliability of responses are sent back to the issuers of those commands.

Communication Settings Manager 418—The Communication Setting Manager maintains administratively configured details of the cluster, including the list of systems, their network addresses, and cryptographic secrets. Managing the process of adding and removing systems in an active cluster.

Tunnel Endpoint Manager 419—This component (shown with additional detail in FIG. 4c is responsible for creating, altering, or removing tunnel redirector endpoints based on global configuration. The Tunnel Endpoint Manager ensures that the tunnel configuration is synchronized between servers, processes updates to the global tunnel configuration, and manages two different types of tunnel endpoints:

TCP Listener Block 432—Listens on a TCP socket. For each newly accepted connection, the TCP Listener Block will initiate a pipe connection to a preconfigured address. Upon successful connection, all data received from the accepted TCP socket will be forwarded to the pipe socket, and vice versa.

Pipe Listener Block 434, 436—Listens on a pipe socket. For each newly accepted connection, the pipe listener block will initiate a TCP connection to a preconfigured address. Upon successful connection, all data received from the accepted pipe socket will be forwarded to the TCP socket, and vice versa.

Internally, the Pipe Router and State Machine 412 as part of the Cluster Monitor 410 includes:

Socket port map—This map indexes all pipe router sockets by the local port they are bound to, as well as the remote port, if they are connected. Allows inbound messages to be quickly routed to the appropriate socket for processing.

Route index—The Route index contains a DTLS state machine and UDP communication channel details for each available peer, indexed by the peer's name. Each route provides a method of sending datagrams to a specific peer.

The Local Monitor 420 resident on each server within the cluster maintains configuration state for tunnels, and provides an administrative interface. Components of the local monitor include:

Client Manager 421—This module is responsible for handling incoming client requests from local clients 403, passing the requests to the Application Coordinator, and maintaining client connections.

Sync Manager 422—The Sync Manager maintains administrative configuration of virtual hosts and applications. Synchronizing configuration between systems as cluster membership changes.

Tunnel State Manager 423—Responsible for executing administrative commands, and synchronizing tunnel configuration with the Cluster Monitor. This component is responsible for maintaining the configuration, which describes a list of tunnels to be maintained across the cluster.

User interface software for inspecting and reconfiguring the applications, cluster, and tunnels is provided by DxGUI/DxCLI/DxMobi Client Software. Client Applications and server applications are resident on each server and the present invention supports the operation of highly available TCP tunnels for use by these applications. TCP tunnels allow these applications to connect to one another through incongruent networks, such as across NAT routers, without opening access to the public Internet.

In addition to servicing TCP connection tunnels, ordered, reliable communication channels provided by the Pipe Router and State Machine of the present invention are necessary for components internal to the Cluster Monitor, such as the Cluster Service State Machine and the Command State Machine. A Pipe Router communication channel is used to send commands to other servers in the cluster, to send responses back to command issuers, and to synchronize configuration.

When configured to use multiple network adapters, the Cluster Monitor's Intermediate Registry Service client component will attempt to communicate with the Intermediate Registry Server using all available network adapters. This allows it to discover endpoint mappings for each network adapter, communicate all known endpoint mappings to other servers, and allow other servers to attempt to form UDP message paths to all configured network adapters.

An entry in the Application Coordinator's tunnel configuration table contains:

Destination gateway names—Identifying the cluster members that will operate the destination tunnel gateways. List of servers in the tunnel's destination failover group. This list contains servers that can fill the role of the destination gateway, and the first server on the list that is available is made active.

Destination target addresses and ports—Identifies the host to which the destination gateway will establish new tunnel connections One or more origins, including:
  Origin gateway name—Cluster member that will operate the origin tunnel gateway
  Origin listening address and port—Describes how the listening TCP port for the origin gateway will be created The Cluster Monitor 410, as part of forming a group of tunnel gateway servers, elects one specific member of that group to serve as the cluster coordinator. Any server in the group can serve as this role. In the Cluster Monitor and according to one embodiment of the present invention, the process of configuring a new tunnel has the following steps:

1. Cluster coordinator sends a request to the destination gateway server to create the pipe listener block. The pipe listener block will be configured to listen on a random pipe port, and connect to the destination target address—the target server application for the tunnel.
2. The destination gateway server responds with the pipe port on which the listener block is bound.
3. Cluster coordinator sends requests to all origin gateway servers to create TCP listener blocks. The TCP listener blocks are configured to connect to the destination gateway server on the pipe port determined in step (2).

The present invention provides automatic failover capability for Origin and Destination tunnel gateways thereby providing highly available networks for applications. Other TCP tunneling technologies, such VPN, are not capable of such automatic failover and rerouting. One must manually reconfigure or re-setup to restore network services. One or reasonable skill in the relevant art will recognize that each module is designed to be self-contained and address a particular task. Each module can then be updated for extended at any times without having to recompile the entire tool. However, all modules must be brought back together to provide this virtualization and consolidation framework.

Systems and methods embodying the present invention are much simpler to set up than a VPN, or an SSH tunnel, or other alternatives, and does not require permission from system and network administrators. Moreover, there is no additional Failover Clustering software required to achieve high availability for applications when using the present invention.

Figure 5:
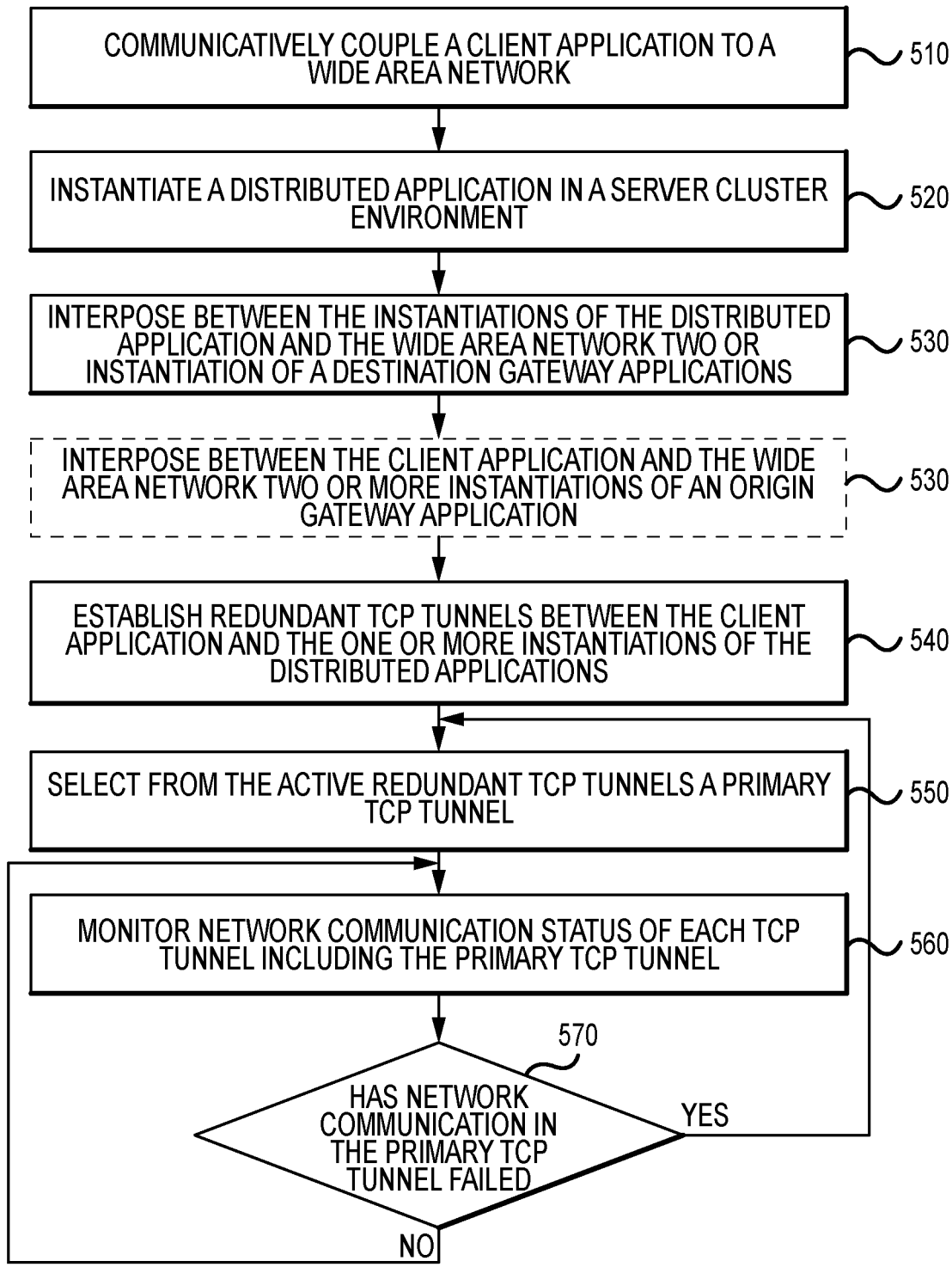
FIG. 5 is a flowchart of one methodology, according to the present invention, for providing redundant transmission control protocol tunneling between a client and a distributed application in a server cluster environment.

FIG. 5 presents a flowchart depicting one methodology which may be used to provide redundant TCP tunnels in a server cluster environment. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

A methodology for establishing a redundant TCP network tunnel environment begins with communicatively coupling 510 a client application, or the like, with a wide area network such as the public Internet. Similarly, instantiations of a distributed application are established 520 in a cluster environment linked to same wide area network. Interposed 530 between the distributed application and the wide area network are two or more instantiations of an application gateway application. Each application gateway application establishes a direct TCP layer 4 path with the distributed application and is configured to repackage application data from a TCP format to a UDP datagram-orientated communication channel format for transportation across the wide area network.

In one embodiment, similar instantiations of an origin gateway application are interposed 530 between the client application and the wide area network. As client application data arrives to each origin gateway application via a direct TCP layer 4 path, the data is repackaged to a UDP datagram-orientated format.

Redundant TCP tunnels are established 540 between the client application and distributed application instantiations using local loopback tunnel endpoints. From among these redundant TCP tunnels a primary TCP tunnel is selected 550 on which client/distributed application data is exchanged.

As data is exchanged the network communication status of each TCP tunnel, including the primary TCP tunnel, is monitored 560. Upon determination 570 that a network communication path failure has occurred on the primary TCP tunnel, the present invention assesses the status of the other redundant TCP tunnels, and selects an active one of the redundant TCP tunnels to be newly assigned as the primary TCP tunnel. In doing so the communication path between the client application and the disturbed application is maintained.

Redundant transmission control protocol tunneling of the present invention channels client application data through the public Internet via a secure UDP channel. By integrating one or more gateway applications interposed between an endpoint (client application or distributed application) and the public Internet using local loopback addresses, the present invention provides failover redundancy.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention.

Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced in distributed computing environments where tasks are performed by remote processing devices that are linked through a communications network. In a distributed computing environment, program modules may be located in both local and remote memory storage devices.

An exemplary system for implementing the invention includes a general purpose computing device such as the form of a conventional computer or the like, including a processing unit, a system memory, and a system bus that couples various system components, including the system memory to the processing unit. The system bus may be any of several types of bus structures including a memory bus or memory controller, a peripheral bus, and a local bus using any of a variety of bus architectures. The computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment.

While there have been described above the principles of the present invention in conjunction with redundant TCP tunneling in a server cluster environment, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

The invention claimed is:

1. A computer system for highly available Transmission Control Protocol (TCP) tunnels, the computer system comprising:
a plurality of computing devices communicatively connected via a network configured into a server cluster wherein each of the computing devices include instructions stored on a non-transitory storage medium and a processor to execute the instructions causing one or more of the computing devices to form
an instantiation of a distributed application,
a client application communicatively coupled to the network,
two or more instantiations of a destination gateway application interposed between the instantiation of the distributed application and the network wherein each instantiation of the destination gateway application is communicatively coupled to the instantiation of the distributed application, and wherein each instantiation of the destination gateway application is configured to establish redundant TCP tunnels transported across the network using UDP datagram-oriented communication channels between destination gateway application and client application and wherein each instantiation of the destination gateway application includes a cluster monitor configured to monitor TCP tunnel status and responsive to identifying failure of communication with the instantiation of the distributed application instantiation associated with a primary TCP tunnel, reassigning one of the other redundant TCP tunnels as the primary TCP tunnel; and two or more instantiations of an origin gateway application interposed between the client application and the network wherein each instantiation of the origin gateway application is communicatively coupled to the client application and wherein each instantiation of the origin gateway application is configured to establish redundant TCP tunnels transported using UDP datagram-oriented communication channels between the origin gateway application and each instantiation of the destination gateway application and wherein one of the redundant TCP tunnels is the primary TCP tunnel, wherein the primary TCP tunnel is associated with a virtual IP address, and wherein each instantiation of the origin gateway application and each instantiation of the destination gateway application includes a cluster monitor configured to monitor status of the distributed application and responsive to failure of communication with the instantiation of the distributed application on the primary TCP tunnel, reassign the virtual IP address of the primary TCP Tunnel to one of the redundant TCP tunnels.

2. The computer system for highly available Transmission control Protocol (TCP) tunnels according to claim 1, wherein client application data is transmitted to each origin tunnel gateway application using a TCP transport suitable format.

3. The computer system for highly available Transmission control Protocol (TCP) tunnels according to claim 2, wherein client application data is packaged into a UDP transport suitable format by at least one of the plurality of origin gateway applications and transported across the network to the distributed application via one of the plurality of destination gateway applications using the primary TCP tunnel.

4. The computer system for highly available Transmission control Protocol (TCP) tunnels according to claim 3, wherein each instantiation of the origin gateway application and the destination gateway application are configured with multiple network interfaces, and wherein each network interface is communicatively coupled with each network interface of other gateway application instances, and wherein through these network interfaces gateway application instances perform network path reachability monitoring to select the primary network tunnel.

5. A computer implemented method for highly available Transmission control Protocol (TCP) tunnels in a server cluster environment, the method comprising:
communicatively coupling a client application to a wide area network;
interposing two or more instantiations of a destination gateway application between one or more instantiations of a distributed application and the wide area network;
establishing redundant TCP tunnels transported across the network using UDP datagram-oriented communication channels between destination gateway application and client application and wherein each instantiation of the destination gateway application includes a cluster monitor;
interposing two or more instantiations of an origin gateway application between the client application and the network wherein each instantiation of the origin gateway application is communicatively coupled to the client application;
establishing redundant TCP tunnels transported using UDP datagram-oriented communication channels between the origin gateway application and each instantiation of the destination gateway application and wherein one of the redundant TCP tunnels is the primary TCP tunnel;
selecting from among the redundant TCP tunnels a primary TCP tunnel associated with a virtual IP address whereby client data is transported to the one or more instantiations of the distributed application via the primary TCP tunnel; and
monitoring status, by the cluster monitor, of the redundant TCP tunnels including the primary TCP tunnel, status of communication with the distributed application instantiation, and status of the distributed application and responsive to failure of communication with the instantiation of the distributed application on the primary TCP tunnel, reassigning the virtual IP address of the primary TCP Tunnel to one of the redundant TCP tunnels.

6. The computer implemented method for highly available TCP tunnels in a server cluster environment according to claim 5, wherein each redundant TCP tunnel includes a direct layer-4 TCP network route between the two or more destination gateway applications and the one or more instantiations of the distributed application.

7. The computer implemented method for highly available TCP tunnels in a server cluster environment according to claim 5, wherein each redundant TCP tunnel includes a UDP datagram-orientated communication channel traversing the wide area network.

8. The computer implemented method for highly available TCP tunnels in a server cluster environment according to claim 5, further comprising establishing by each of the two or more origin gateway applications and the two or more destination gateway applications the redundant tunnels between the client application and the one or more instantiations of the distributed application.

9. The computer implemented method for highly available TCP tunnels in a server cluster environment according to claim 5, further comprising configuring each instantiation of the origin gateway application and each instantiation of the destination gateway application with multiple network interfaces, and communicatively coupling each network interface with each network interface of other gateway application instances wherein through these network interfaces gateway application instances perform network path reachability monitoring to select the primary network tunnel.

10. A non-transitory machine-readable storage medium having stored thereon instructions, comprising machine executable code, for establishing highly available TCP tunnels in a server cluster environment which when executed by at least one machine, causes the machine to:
communicatively couple a client application to a wide area network;
interpose two or more instantiations of a destination gateway application between one or more instantiations of a distributed application and the wide area network;
establish redundant TCP tunnels transported across the network using UDP datagram-oriented communication channels between destination gateway application and client application and wherein each instantiation of the destination gateway application includes a cluster monitor;
interpose two or more instantiations of an origin gateway application between the client application and the network wherein each instantiation of the origin gateway application is communicatively coupled to the client application;
establish redundant TCP tunnels transported using UDP datagram-oriented communication channels between the origin gateway application and each instantiation of the destination gateway application and wherein one of the redundant TCP tunnels is the primary TCP tunnel;
select from among the redundant TCP tunnels a primary TCP tunnel associated with a virtual IP address whereby client data is transported to one of the one or more instantiations of the distributed application via the primary TCP tunnel; and
monitor the status; by the cluster monitor, of the redundant TCP tunnels including the primary TCP tunnel; and status of communication with the one of the one or more instantiation of the distributed application instantiation, and status of the distributed application, and responsive to failure of communication with the instantiation of the distributed application on the primary TCP tunnel, reassign the virtual IP address of the primary TCP Tunnel to one of the redundant TCP tunnels.

11. The non-transitory machine-readable storage medium of claim 10, further comprising instructions to form a direct layer-4 TCP network route between the two or more destination gateway applications and the one or more instantiations of the distributed application.

12. The non-transitory machine-readable storage medium of claim 10, wherein each redundant TCP tunnel includes a UDP datagram-orientated communication channel traversing the wide area network.

13. The non-transitory machine-readable storage medium of claim 10, further comprising instructions to establish by each of the two or more origin gateway applications and the two or more destination gateway applications redundant TCP tunnels between the client application and the one or more instantiations of the distributed application.

14. The non-transitory machine-readable storage medium of claim 10, further comprising instructions to configure each instantiation of the origin gateway application and each instantiation of the destination gateway application with multiple network interfaces, and communicatively couple each network interface with each network interface of other gateway application instances wherein through these network interfaces gateway application instances perform network path reachability monitoring to select the primary network tunnel.

\* \* \* \* \*